United States Patent [19]
Predebon

[11] Patent Number: 5,695,267
[45] Date of Patent: Dec. 9, 1997

[54] PHOTO VIEWING ASSEMBLY

[76] Inventor: Roberto Predebon, Av. Igreja, 37 - Ap. 1002, Tramandia - RS, Brazil, CEP 95590000

[21] Appl. No.: 723,671

[22] Filed: Sep. 30, 1996

[51] Int. Cl.$^6$ .................................................. G03B 21/14
[52] U.S. Cl. ................................. 353/120; 40/367
[58] Field of Search ................. 353/120, 65, DIG. 4; 40/701, 362, 363, 366, 790, 361

[56] References Cited

U.S. PATENT DOCUMENTS

| | | | |
|---|---|---|---|
| 2,876,674 | 3/1959 | Oulhaner | 40/363 |
| 4,343,538 | 8/1982 | Astero | 353/DIG. 4 |
| 4,454,669 | 6/1984 | Simmons | 40/362 |
| 4,550,515 | 11/1985 | Simmons | 40/362 |
| 4,996,785 | 3/1991 | Cicenas | 40/361 |

*Primary Examiner*—William Dowling
*Attorney, Agent, or Firm*—Malloy & Malloy, P.A.

[57] ABSTRACT

A photo viewing assembly including a housing with a base member, and a photo support extending upwardly from the base member and structured to retain a developed photograph in a viewing orientation. Moreover, a magnifying lens is secured to said housing and disposed a spaced apart distance from the photo support so as to provide a magnified image of the complete developed photograph disposed on the photo support. At least one light source is disposed in forward, confronting relation to the photo support and the developed photograph disposed thereon so as to illuminate a front face of the developed photograph and substantially enhance the magnified image. The housing further includes a pair of spaced apart flange elements structured to shield the light source from the magnifying lens and substantially direct the illumination provided thereby at the photo support.

26 Claims, 2 Drawing Sheets

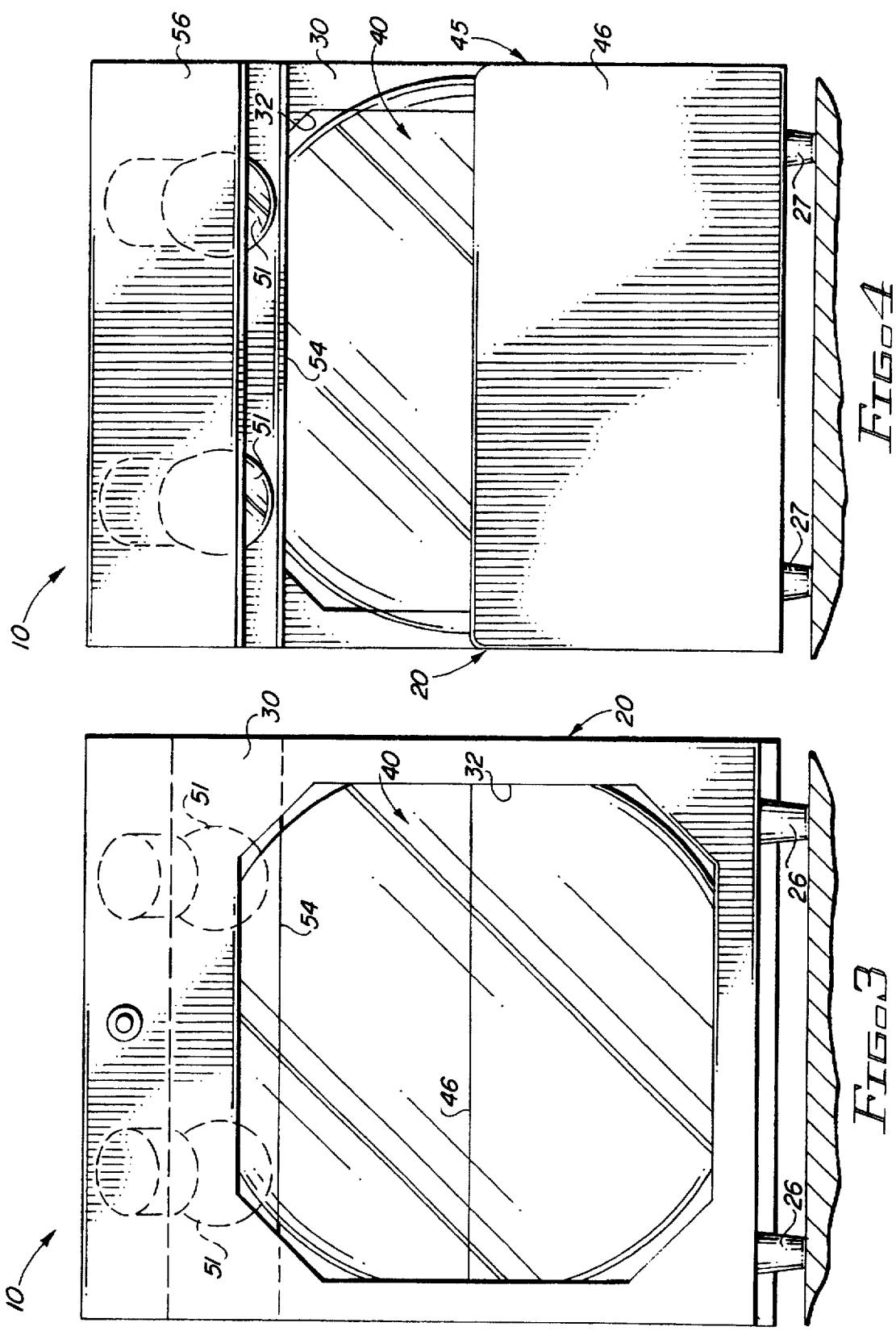

PHOTO VIEWING ASSEMBLY

BACKGROUND OF THE INVENTION

1. Field of the Invention

The present invention relates to a photo viewing assembly which enables a user to easily and conveniently view a conventional developed photograph in an attractive, visually enhanced manner.

2. Description of the Related Art

Photographs are a highly popular, effective and inexpensive means of capturing events, memories and other visual information. In fact, virtually every person has taken some photographs and/or possesses some developed photographs which they enjoy viewing from time to time. Although most people would ideally prefer each individual photograph to have a large, easily visible size, cost and practicality necessitate that standard photographs be of a relatively small, limited size. In particular, this limited size is dictated by the resolution of the photographs, as well as the requirements of convenient storage. Moreover, given the often limited printing capacities of the photograph developing facility, as larger photographs will generally require specialized machines, cost consideration also play an important role in limiting the practical size of developed photographs. Still, however, individuals enjoy taking and having photographs, and enjoy reviewing the photographs periodically such that it would be beneficial to provide an assembly which maximizes the aesthetic appeal of those conventionally available developed photographs without substantially complicating or increasing the cost of doing so.

Specifically, it is seen that the generally small size of the photograph is a major drawback associated with the viewing and reviewing of photographs. Furthermore, because lighting conditions are often less than ideal when viewing photographs, the conditions in which the smallish photographs are viewed further detracts from their aesthetic appeal. As such, it would be highly beneficial to provide an assembly which takes into account a variety of the important factors associated with viewing a developed photograph, and is substantially easy to implement and utilize in order to permit developed photographs to be positioned and viewed in an enhanced and effective manner. Such an assembly should maximize the benefits of lighting in order to provide a clear, crisp, glare-free image whose colors stand out in an effective manner. Furthermore, such a device should maximize the detail of the photograph in a complete manner, thereby allowing all of the photograph to be effectively viewed.

In the past, others have developed a variety of devices for viewing film and slides without the need of a projector. Typically, these devices seek to enlarge an image to a certain extent and provide some back lighting such that the image can be viewed on a screen. Of course, however, such devices are not directed towards and could not be effectively used with developed film. In particular, such devices rely on a projection of light through the film or slide, a procedure which is not possible with developed photographs given its nature and the conventional utilization of photographic backing paper to provide rigidity and establish an appropriate backing. Moreover, such devices, due to the exceptionally small nature of the individual slides or film strips, often require significant magnification and require a large viewing area. Alternatively, however, if individual "frame by frame" viewing of images is desired, devices which are currently available are generally configured so as to provide for a limited field of view, and do not provide ideal photo quality images. Specifically, such individual viewing devices generally incorporate an eye piece or like small magnifying item through which the back lit slide/film is viewed for inspection purposes. Further, such a magnifying item will generally only enable portions of the small slide or frame of film to be viewed at one time, thereby limiting the enjoyment and overall appeal of the image, and includes a substantially small field of view. As such, such known devices are generally used for purposes of analysis or preliminary review prior to the development of a conventional developed photograph which brings out all of the appropriate colors and image.

Accordingly, there is still a substantial need in the art for a device which is specifically structured for, and can be effectively used with developed photographs of the type commonly produced and possessed by most individuals. Such a device should be particularly configured so as to provide clear and accurate viewing of a complete enhanced, enlarged image without the need for substantial modification or repositioning, and in a manner which ensures that the entire photograph is viewed in the manner in which it was intended to be viewed. Additionally, such a device should provide for effective lighting enhancement of the developed photograph without a risk of glare, shadowing, or other lighting difficulties which often plague conventional photographic viewing.

SUMMARY OF THE INVENTION

The present invention is directed towards a photo viewing assembly utilized to effectively view developed photographs in an enhanced, increasingly attractive manner. Specifically, the photo viewing assembly includes a housing, preferably of a portable and manipulable lightweight construction, thereby enabling the assembly to be easily utilized in virtually any circumstance. Extending upwardly from the housing, and in particular from a base member of the housing, is a photo support. The photo support is structured to retain and effectively dispose a conventional, fully developed photograph in a viewing orientation.

Additionally, the photo viewing assembly includes magnifying means. The magnifying means are set a predetermined spaced apart distance from the photo support and are also secured to the housing. Moreover, the magnifying means are specifically structured and disposed to provide a complete magnified image of the entire developed photograph that is positioned in the viewing orientation on the photo support. As such, by utilizing the magnifying means, a user is able to examine all of the developed photograph in a visually enhanced manner.

Disposed in forward, confronting relation to the photo support, is at least one light source. Specifically, the light source is structured to illuminate a front face of the developed photograph positioned in the viewing orientation by the photo support. As such, the magnified image seen through the magnifying means is further enhanced due to the effective, proper illumination, without shadowing or glare that can detract from the viewing quality of the image. In particular, so as to effectively shield the light source from the magnifying means, and thereby eliminate reflective glare, and so as to substantially direct the illumination provided by the light source at the photo support, so that it may effectively and completely illuminate the developed photograph, the present invention further includes shielding means. The shielding means are also included as part of the housing and will shield the light source such that substantially all of the illumination provided thereby is directed solely at the photo support in a concentrated, evenly balanced fashion.

It is an object of the present invention to provide a photo viewing assembly which can effectively and conveniently receive developed photographs of standard, conventional dimensions.

Also an object of the present invention is to provide a photo viewing assembly which provides magnified, enhanced viewing of a standard developed photograph.

Another object of the present invention is to provide a photo viewing assembly which places a developed photograph in a proper lighting environment, with minimal shadowing and without risk of glare to the enhanced viewing thereof.

Still another object of the present invention is to provide a photo viewing assembly which provides for an enlarged, enhanced viewing image of an entire developed photograph, without requiring repositioning and maneuvering of the developed photograph in order to view all portions thereof.

An additional object of the present invention is to provide a photo viewing assembly which is substantially compact and portable, and which is easy to implement and utilize to view large quantities of photographs in effective and pleasurable

BRIEF DESCRIPTION OF THE DRAWINGS

For a fuller understanding of the nature of the present invention, reference should be had to the following detailed description taken in connection with the accompanying drawings in which:

FIG. 3 is a front view of the photo viewing assembly of the present invention; and FIG. 4 is a rear view of the first embodiment of the photo viewing assembly of the present invention.

Like reference numerals refer to like parts throughout the several views of the drawings.

DETAILED DESCRIPTION OF THE PREFERRED EMBODIMENT

Figure 1:
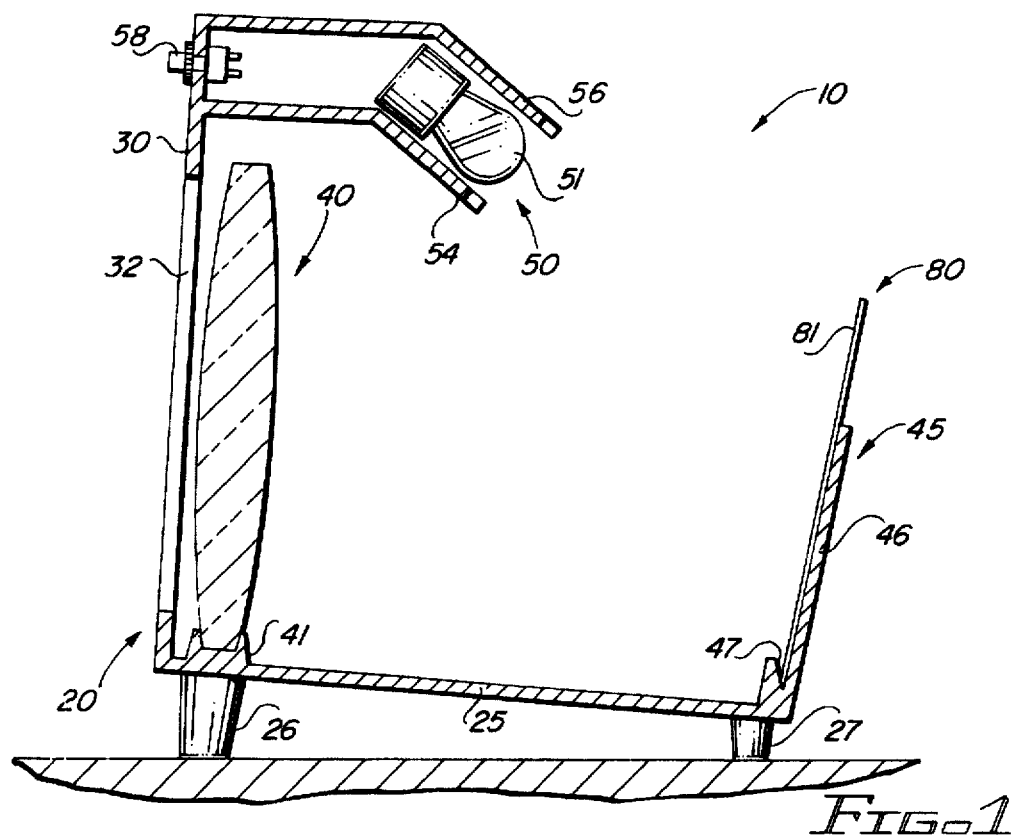
FIG. 1 is a side cross sectional view of a first embodiment of the photo viewing assembly of the present assembly.

Shown throughout the Figures, the present invention is directed towards a photo viewing assembly, generally indicated as 10. The photo viewing assembly 10 is structured to provide for and permit the effective, convenient and enhanced viewing of a conventional size, developed photograph 80.

In particular, the photo viewing assembly includes a housing, generally 20. The housing 20, which preferably contains the remaining components of the photo viewing assembly 10 is structured to be generally compact and lightweight so as to facilitate transportation and manipulation thereof as needed. In a preferred embodiment, the housing 20 can be substantially formed of molded plastic or shaped wood so as to provide for ease of manufacture and/or an attractive exterior appearance.

Included as part of the housing 20 is a base member 25. The base member 25 is generally planer and elongate so as to effectively accommodate various internal components of the photo viewing assembly 10 in a necessary fashion. In particular, one of the internal components of the photo viewing assembly 10 includes a photo support 45. The photo support 45 is specifically structured to maintain a developed photograph 80 in a desired viewing orientation, such that a front face 81 of the developed photograph 80 can be effectively and appropriately viewed through the viewing assembly 10. In a preferred embodiment of the present invention, the photo support 45 extends upwardly from the base member 25 and includes a generally vertically depending member 46. Furthermore, the generally vertically depending member 46 is angled and oriented relative to the base member 25 such that the developed photograph 80 leans up against its surface and is maintained in a corresponding viewing orientation. In the preferred embodiment, the vertically depending member 46 includes a single planer panel, however, in alternative embodiments, one ore more segments may be provided so long as the photograph 80 is supportingly maintained in the viewing orientation.

Additionally, so as to prevent the developed photograph 80 from sliding forward or otherwise moving out of its viewing orientation, an elongate notch 47 is preferably disposed at a base of the generally vertically depending member 46. In this embodiment, the elongate notch 47 receives an edge of the developed photograph 80 supportably therein, thereby effectively retaining the developed photograph and preventing movement thereof. Moreover, the elongate notch 47 may be configured such that a plurality of developed photographs may be contained therein, with a front photograph merely being removed in order to reveal the next photograph from the plurality supportably retained within the elongate notch 47 and against the vertically depending member 46. Additionally, if desired, the photo support 45 may include merely the elongate notch 47, with the elongate notch 47 essentially clamping down on the edge of the developed photograph 80 so as to grasp the photograph 80 and hold it in place, therefore utilizing the photographs own rigidity to maintain the generally vertically disposed, viewing orientation.

Figure 2:
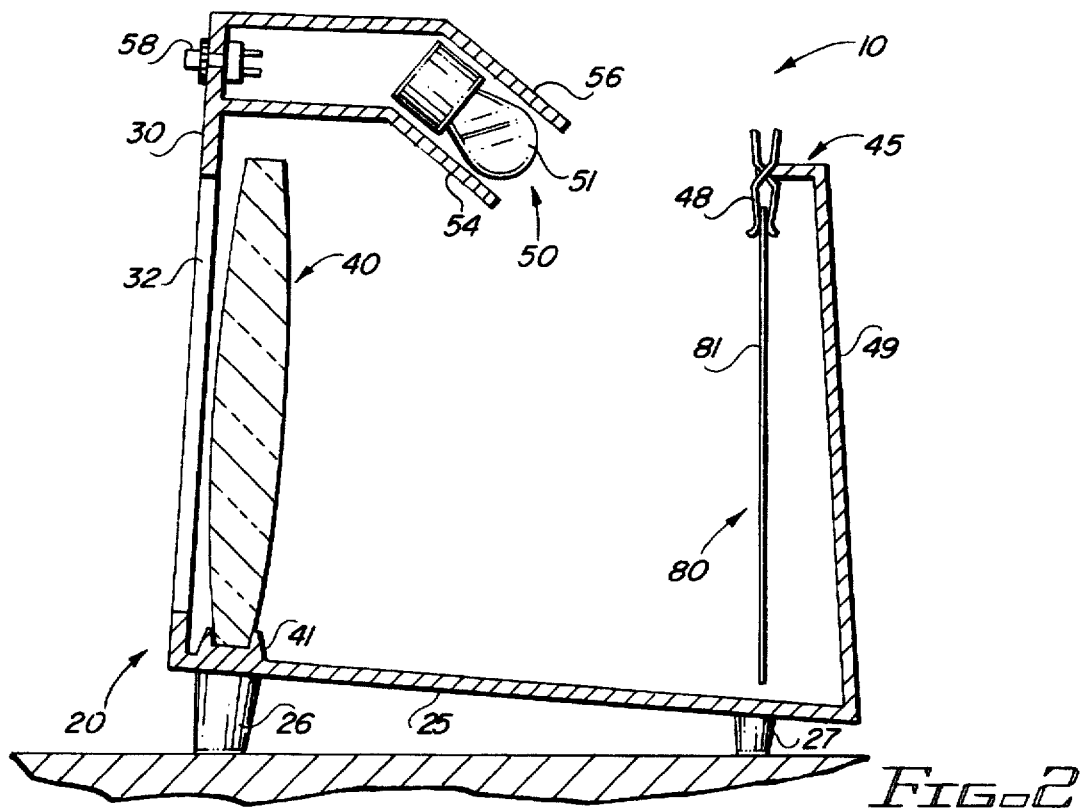
FIG. 2 is a cross sectional of another embodiment of the photo viewing assembly of the present invention.

In yet another embodiment of the present invention, as illustrated in FIG. 2, the photo support 45 may include a clip 48 structured to be secured to developed photograph 80, so as to maintain the developed photograph 80 in the viewing orientation. Although the clip 48 may be disposed to grasp a lower edge or a side edge of the developed photograph 80, in the preferred, illustrated embodiment, the clip 48 is structured to grasp an upper edge of the photograph and thereby suspend the developed photograph 80 in the viewing orientation. In this regard, a vertical support 49 extends upwardly from the base member 25 and is structured such that the clip 48 is properly orientated and aligned to grasp and effectively suspend the developed photograph 80 in the viewing orientation. In this embodiment, when a new photograph is to be reviewed, the viewed photograph is merely unclipped in order to reveal another photograph which is already secured by the clip 48, or to permit a new photograph to be easily clipped in place.

As such, it can be seen that a variety of configurations may be provided for the photo support in order to maintain the developed photograph 80 in an effective viewing orientation; however, it is preferred that the most easy to access and implement open photo support 45, such as the generally vertically depending member 46 and elongate notch 47 of FIG. 1, are preferred. Such an embodiment substantially increases the ease with which the developed photographs 80 can be positioned and/or removed to and from the viewing orientation.

Disposed a spaced apart distance from the photo support 45 are magnifying means 40. The magnifying means 40 are specifically structured to provide a magnified image of the developed photograph 80 disposed in the viewing orientation by the photo support 45. Furthermore, the magnifying means 40 are sufficiently large such that a complete magnified image of all of the front face 81 of the developed photograph 80 is may be conveniently viewed therethrough. As such, when viewing the particular developed photograph 80, a user need not adjust maneuver and/or manipulate the photograph 80 or magnifying means 40 in order to effectively see select portions of the front face 81 of the developed photograph 80. Rather a viewer looking normally through the magnifying means 40 of the present invention can see all of the image on the developed photograph.

In the preferred embodiment, the magnifying means 40 includes a generally vertical mounted magnifying glass. The magnifying glass, which is preferably round in configuration has an amplifying power of 2X and a 4 inch diameter, thereby significantly enhancing the viewed image to a more acceptable form. Furthermore, the magnifying means 40 are preferably disposed about five, and in particular 5.2, inches from the photo support 45 in order to ensure that appropriate focus of the developed photograph 80 is achieved when viewed through the magnifying means 40. In this embodiment, the magnifying means are vertically secured and oriented by a mount stand 41 secured to the base member 25.

The photo viewing assembly 10 of the present invention further includes illuminating mean, generally indicated as 50. The illuminating means 50 are disposed specifically in forward, confronting relation to the photo support 45, and hence to a developed photograph 80 disposed on the photo support 45. Accordingly, the illuminating means 50 will illuminate the front face 81 of the photograph 80, permitting the magnified image to be seen through the magnifying means 40 in a significantly enhanced and clearer manner. In particular, as conventional developed photographs 80 are generally placed on a backing of photographic paper, conventional slide viewing assemblies which provide for effectively back lighting would not be sufficient to provide any effective illumination to the magnified image, and moreover would likely tend to discolor or otherwise lessen the magnified image. Additionally, a separate independent light and/or natural lighting would not provide for effective balance and appropriate illumination and enhancement of the developed photograph 80. In that regard, the illumination means 50 of the present invention includes at least one light source disposed in a spaced apart, confronting relation to the photo support 45. Although a single, elongate incandescent type bulb may be utilized as the illumination means 50, in the preferred embodiment, at least two light sources 51, preferably in the form of 40 WATT light bulbs are disposed a spaced apart distance from one another, and so as to directly and evenly illuminate the developed photograph 80 disposed on the photo support 85. Specifically, the light sources 51 are spaced apart from one another such that shadowing from a particular side does not result when viewing the developed photograph 80. Rather a balanced illumination of the entire front face 81 of the developed photograph 80 is achieved to ensure that a viewer viewing any portion of the developed photograph 80 can enjoy the same enhanced image. In this regard it is seen that the combination of magnification of the entire image, along with consistent, effective and appropriate illumination of the developed photograph 80 provides for an increased and more pleasant viewing experience.

Additionally, so as to further improve the effectiveness of the illumination means 50, the light sources 51 of the illumination means 50 are preferably shielded from the magnifying means 40. As such, glare or other reflections of the light on the magnifying means 40 can be prevented and will not affect the viewing of the developed photograph. Moreover, the shield means will preferably also shield the light sources 51 of the illuminating means 50 from an exterior of the housing 20, thereby focusing and directing a substantial amount of the illumination provided by the light sources 51 towards the photo support 45 and therefore the developed photograph 80 disposed thereon. In the preferred embodiment, the shielding means includes a pair of spaced apart flanged elements 54 and 56 that are secured to an extend from a upwardly depending support 30 of the housing 20. In particular, the upwardly depending support 30 extends from the base member 25 of the housing 20 and is structured such that the light sources 51, and the remainder of the illuminating means 50 may be secured thereto. For example, a switch 58 connected to the light sources 51 may be disposed in the upwardly depending support 30 so as to be exteriorly actuatable and facilitate the turning on/off of the illumination means 50. Of course, the illumination means 50 may be powered by a variety of sources, such as by replaceable battery power or by electrical powering through a conventional electrical cord that can be concealed within the housing 20.

Looking once again to the spaced apart flange elements 54 and 56, it is seen that a lower flange element 54 extends beneath the light sources 51 so as to shield the light sources 51 from direct illumination of the magnifying means 40. Similarly, the upper flange element 56 is positioned such that the illumination will be focused and concentrated downwardly towards the photo support 45. In particular, the illuminating means 50, although they may be disposed from a lower region of the housing 20, are preferably positioned in an elevated, confronting orientation to the photo support 45 so as to not obstruct the effective viewing of the developed photograph 80 through the magnifying means 40, while still maintaining a close proximity and effectively directing a comfortable, image enhancing illumination towards the photograph. Additionally, a reflective surface may be provided on one or both of the flange elements 54 and 56 so as to further concentrate the illumination.

In the preferred embodiment, wherein the housing 20 is formed of a lightweight plastic material, it is seen that the base member 25, photo support 45, upwardly depending support 30 and flange elements 54 and 55 may be integrally formed with one another. Also, in a preferred embodiment, and as illustrated in the Figures, the upwardly depending support 30 is preferably disposed in front of the magnifying means 40, thereby effectively protecting and containing the magnifying means 40 within the housing 20. In this regard, the upwardly depending support 30 includes a viewing opening 32 disposed therein and structured to permit effective viewing therethrough. As such, a user can look through the viewing opening 32 and the magnifying means 40 in order to effectively view the developed photograph 80. It should also be noted, that so as to further facilitate effective viewing of the developed photograph 80, one or more support stanchions 26 and 27 are preferably included and extend from the base member 25. Specifically, these stanchions 26 and 27 are positioned so as to maintain the housing 20 in a generally angled orientation, with the forward support stanchions 26 being of a generally higher elevation. As such, a user looking through the viewing opening 32 need not necessarily crouch down to eye level so as to view completely through the magnifying means 40 and view the entire developed photograph 80. Rather, from a comfortable seated orientation with the photo viewing assembly 10 disposed on any support surface such as a table, a user can look into the housing 20 to examine and view the developed photograph 80.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A photo viewing assembly comprising:

A photo support structured to retain a developed photograph in a viewing orientation, magnifying means disposed a spaced apart distance from said photo support, said magnifying means being structured to provide a magnified image of the developed photograph disposed on said photo support, illumination means disposed in forward, confronting relation to said photo support and the developed photograph disposed thereon, and structured to illuminate a front face of the developed photograph such that said magnified image seen through said magnifying means is enhanced, at least two light sources disposed a spaced apart distance from one another and said photo support so as to directly and evenly illuminate the developed photograph disposed in said viewing orientation by said photo support without shadowing, and said light source being shielded from said magnifying means so as to eliminate glare.

2. A photo viewing assembly as recited in claim 1 wherein said magnifying means is structured to provide a complete magnified image of substantially all of the front face of the developed photograph.

3. A photo viewing assembly as recited in claim 1 wherein said magnifying means includes a magnifying glass structured to provide a complete magnified image of all of the front face of the developed photograph.

4. A photo viewing assembly as recited in claim 3 wherein said magnifying glass is round.

5. A photo viewing assembly as recited in claim 4 wherein said magnifying glass includes a diameter of about 4 inches.

6. A photo viewing assembly as recited in claim 3 wherein said magnifying glass has an amplifying power of 2x.

7. A photo viewing assembly as recited in claim 6 wherein said magnifying means is disposed about 5 inches from said photo support.

8. A photo viewing assembly as recited in claim 6 wherein said magnifying means are disposed 5.2 inches from said photo support.

9. A photo viewing assembly as recited in claim 1 wherein said photo support includes a generally vertically depending member against which the developed photograph is supportably disposed.

10. A photo viewing assembly as recited in claim 1 wherein said photo support includes an elongate notch structured to receive an edge of the developed photograph supportably therein.

11. A photo viewing assembly as recited in claim 10 wherein photo support further includes a generally vertically depending member against which the developed photograph is supportably disposed.

12. A photo viewing assembly as recited in claim 1 wherein said photo support includes a clip structured to be secured to the developed photograph so as to maintain the developed photograph in said viewing orientation.

13. A photo viewing assembly as recited in claim 1 wherein said light sources include 40 watt light bulbs.

14. A photo viewing assembly as recited in claim 1 wherein said light sources are externally shielded so as to direct a substantial amount of the illumination generated thereby towards said photo support.

15. A photo viewing assembly comprising:

A photo support structured to retain a developed photograph in a viewing orientation, magnifying means disposed a spaced apart distance from said photo support, said magnifying means being structured to provide a magnified image of the developed photograph disposed on said photo support, illumination means disposed in forward, confronting relation to said photo support and the developed photograph disposed thereon, and structured to illuminate a front face of the developed photograph such that said magnifying image seen through said magnifying means is enhanced, said photo support including an elongate notch structured to receive an edge of the developed photograph supportably therein.

16. A photo viewing assembly comprising:

A photo support structured to retain a developed photograph in a viewing orientation, magnifying means disposed a spaced apart distance from said photo support, said magnifying means being structured to provide a magnified image of the developed photograph disposed on said photo support, illumination means disposed in forward, confronting relation to said photo support and the developed photograph disposed thereon, and structured to illuminate a front face of the developed photograph such that said magnifying image seen through said magnifying means is enhanced, and said photo support including a clip structured to be secured to the developed photograph so as to maintain a developed photograph in said viewing orientation.

17. A photo viewing assembly comprising:

a housing, said housing including a base member, a photo support extending upwardly from said base member and structured to retain a developed photograph in a viewing orientation, magnifying means secured to said housing and disposed a spaced apart distance from said photo support, said magnifying means being structured to provide a magnified image of the developed photograph disposed on said photo support, at least one light source disposed in forward, confronting relation to said photo support and the developed photograph disposed thereon, and structured to illuminate a front face of the developed photograph such that said magnified image seen through said magnifying means is enhanced, and said housing further including shielding means structured to shield said light source from said magnifying means and substantially direct said illumination provided thereby at said photo support.

18. A photo viewing assembly as recited in claim 17 including a pair of said light sources disposed a spaced apart distance from one another and mounted to said housing in a generally elevated orientation.

19. A photo viewing assembly as recited in claim 18 wherein said housing includes an upwardly depending support to which said light sources are secured in said generally elevated orientation.

20. A photo viewing assembly as recited in claim 19 wherein said upwardly depending support includes a viewing opening defined therein and structured to permit viewing through said magnifying means disposed in said housing.

21. A photo viewing assembly as recited in claim 20 wherein said shielding means includes a pair of spaced apart flange elements which extend from said upwardly depending support of said housing and are disposed in sandwiching, shielding relation about said light sources.

22. A photo viewing assembly as recited in claim 21 wherein said photo support further includes an elongate notch structured and disposed to receive an edge of the developed photograph retained therein.

23. A photo viewing assembly as recited in claim 22 wherein said magnifying means is structured to provide a complete magnified image of all of the front face of the developed photograph.

24. A photo viewing assembly as recited in claim 23 wherein said magnifying means includes a vertically mounted magnifying glass.

25. A photo viewing assembly as recited in claim 24 wherein said magnifying glass is disposed about 5.2 inches from said photo support.

26. A photo viewing assembly as recited in claim 25 wherein said magnifying glass has an amplifying power of 2×.

* * * * *